United States Patent [19]

Arvin

[11] Patent Number: 5,389,912
[45] Date of Patent: Feb. 14, 1995

[54] TRUCK CLEARANCE ANTI-COLLISION DEVICE

[76] Inventor: Parham P. Arvin, 3200 N. Lake Shore Dr., Ste. #2606, Chicago, Ill. 60657

[21] Appl. No.: 15,977

[22] Filed: Feb. 10, 1993

[51] Int. Cl.⁶ .............................................. B60Q 1/00
[52] U.S. Cl. ...................................... 340/435; 340/436; 340/903; 340/943; 116/67 R; 250/222.1; 364/436
[58] Field of Search ............... 340/435, 436, 440, 429, 340/903, 904, 933, 943, 942, 438, 666; 116/67 R; 250/222.1; 346/107 VP; 364/436

[56] References Cited

U.S. PATENT DOCUMENTS

| | | | |
|---|---|---|---|
| 2,554,371 | 5/1951 | Marx | 340/440 |
| 2,813,940 | 11/1957 | Poet . | |
| 2,834,002 | 5/1958 | Nordsiek . | |
| 2,894,087 | 7/1959 | Kramer . | |
| 3,232,265 | 2/1966 | Hurt . | |
| 3,269,783 | 8/1966 | Kriz . | |
| 3,360,775 | 12/1967 | Schroeder . | |
| 3,720,916 | 3/1973 | Edgar | 340/436 |
| 3,726,916 | 3/1973 | Edgar | 340/436 |
| 3,896,414 | 7/1975 | Rulo | 340/942 |
| 4,015,232 | 3/1977 | Sindle | 340/904 |
| 4,156,865 | 5/1979 | Lovell et al. | 340/436 |
| 4,284,971 | 8/1981 | Lowry et al. | 340/904 |
| 4,327,446 | 12/1980 | Roberts | 340/436 |
| 4,789,941 | 12/1988 | Nunberg | 340/933 |
| 4,796,911 | 1/1989 | Kuroki et al. | 280/689 |
| 4,847,591 | 7/1989 | Ota et al. . | |
| 4,849,731 | 7/1989 | Melocik | 128/842 |
| 4,916,429 | 4/1990 | Hicks et al. | 340/436 |
| 4,952,908 | 8/1990 | Sanner | 340/429 |
| 5,028,920 | 7/1991 | Dombrowski | 340/904 |
| 5,059,946 | 10/1991 | Hollowbush | 340/435 |
| 5,076,384 | 12/1991 | Wada et al. | 340/943 |
| 5,173,692 | 12/1992 | Shapiro et al. | 540/943 |

FOREIGN PATENT DOCUMENTS

| | | |
|---|---|---|
| 1218194 | 6/1966 | Germany . |
| 175442 | 10/1982 | Japan . |
| 0263585 | 10/1989 | Japan . |

OTHER PUBLICATIONS

Article from "The American City" dated Sep. 1973.

Primary Examiner—John K. Peng
Assistant Examiner—Nina Tong
Attorney, Agent, or Firm—Shlesinger Arkwright & Garvey

[57] ABSTRACT

Vehicle clearance anti-collision device includes an ultrasonic wave transmitter transducer and an ultrasonic wave receiver transducer for receiving waves generated by the ultrasonic wave transmitter transducer and reflected off an object disposed vertically above the vehicle. The device is mountable on a portion of a vehicle for transmitting substantially vertical ultrasonic waves. A computer device operatively associated with the ultrasonic wave transmitter and receiver transducers calculates the vertical difference between the object and the height of the truck and provides human-recognizable information to the operator of the truck as to the vertical clearance available between the object and an uppermost portion of the vehicle.

14 Claims, 2 Drawing Sheets

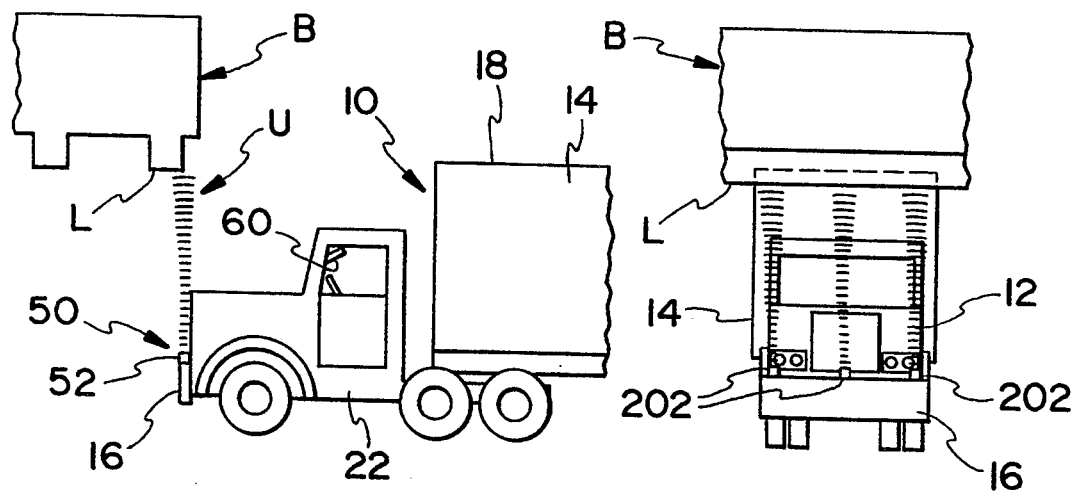
FIG. 1    FIG. 7
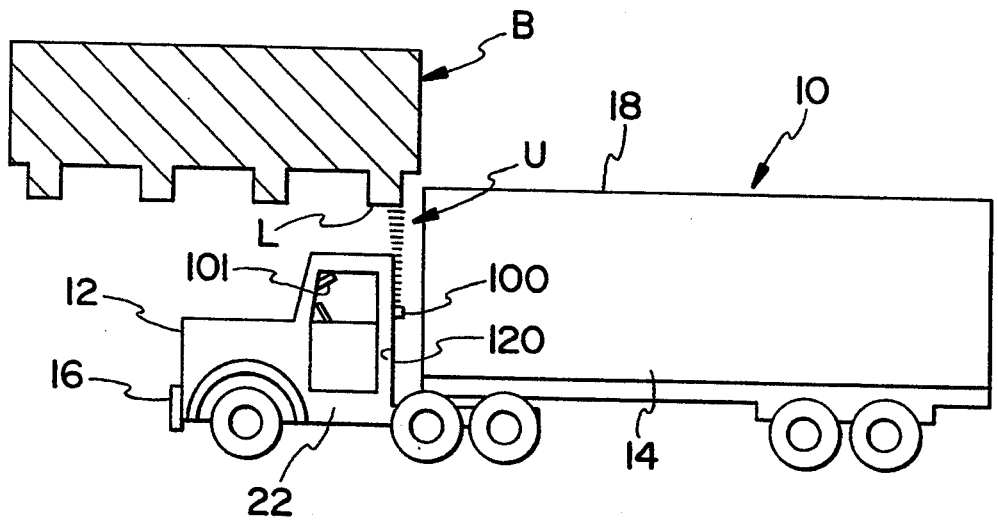
FIG. 2
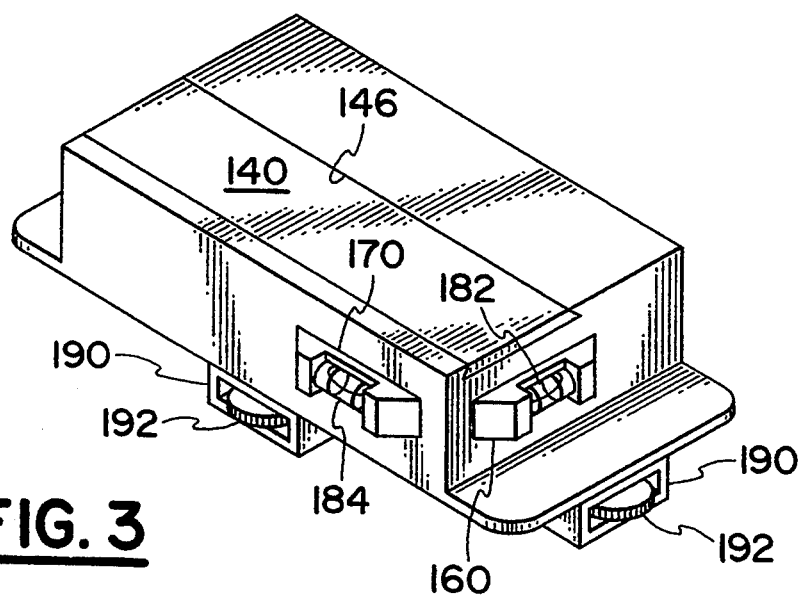
FIG. 3

TRUCK CLEARANCE ANTI-COLLISION DEVICE

FIELD OF THE INVENTION

This invention relates to a device for preventing collisions between vehicles and overhead objects by determining the difference between the vehicle height and the height of the object, and then providing that information to the driver of the vehicle.

BACKGROUND OF THE INVENTION

The problem of vehicles, such as trucks, hitting overhead obstructions has become greater in recent years.

The frequency of this problem occurring has increased for a variety of reasons.

First, there is a greater amount of truck traffic on the nation's highways, owing to the continued switching of railroad freight to truck freight. Hence, a greater number of trucks on the road equals a greater number of accidents involving the roofs of the truck trailer body hitting a low bridge, for example.

Second, there is an increased use of independent truckers who own their own cabs. Such truckers frequently drive cargo in trailers of varying heights. Accordingly, if a trucker is not familiar with the actual height of the trailer he or she is driving, or is unaware that the trailer has a higher than standard height, the potential for an accident involving hitting an overhead object increases.

Third, the infrastructure of highways and bridges has been allowed to deteriorate owing to budgetary constraints on the local, state, and federal level. Thus, older bridges abound which frequently are relatively low compared to recently constructed bridges.

Truckers unfamiliar with such older, lower bridges often run into them with the body of the trailer they are trucking. Further, such older bridges were often constructed having arched supports, which arched supports have a highest point above the ground in the middle of the bridge over the roadway passing underneath the bridge, and a lower point at each of the far left and right side termination points of the curvature of the arch. This arch construction itself poses a couple of problems; namely, the trucker may be familiar with modern bridges having a substantially horizontal, fixed bridge height relative to the road underneath, and may not appreciate that arched bridges present an obstacle of varied height. In addition, given that vehicles travel in the right lane in most countries, and given the typical location of the steering wheel of the truck in the left side of the truck cab in such countries, the driver of the truck is seated nearer to the high point of such arched bridges, while to the right of the trucker, the arched bridge presents a lower profile which may be lower than the roof line of the right side of the trailer body.

Finally, given budget restraints many bridges have no bridge heights posted on them, as lost and stolen height indicator signs are often not been timely replaced.

Earlier systems for avoiding collisions between vehicles and overhead obstructions have attempted to eliminate the problem in a variety of ways.

U.S. Pat. No. 3,232,265 to Hurt discloses a height clearance indicator which includes a flexible, antenna-like height indicator which physically contacts an overhead object and provides a relatively direct indication of the height of the object by mechanical means. Although the Hurt clearance indicator is useful owing to its functioning without an electrical supply, a drawback of this device is that it will wear over time given its direct physical contact with obstructions.

U.S. Pat. No. 4,284,971 to Lowry et al. discloses an overheight vehicle detection and warning system which is installed along a roadway, measures the vehicle height as it passes the system, and illuminates a warning sign telling the driver of the truck to stop if the vehicle height is greater than an approaching bridge. Not only is this system complicated, and expensive, but it must reliably determine the height of moving vehicles. Although the Lowry system provides a standby electrical system to warn the vehicle operator that the height measurement system is not operating, if such is the case, the vehicle operator must make his or her own decision as to whether the upcoming bridge is sufficiently high to drive underneath.

There have been applications of ultrasonic waves in conjunction with collecting data about vehicles.

U.S. Pat. No. 4,789,941 to Nunberg discloses another road-based system which is a computerized vehicle classification system that calculates the height of the vehicle in order to classify the vehicle for toll collection or traffic control purposes. The Nunberg system is inapplicable for determining the absolute heights of vehicles, as this system rejects the height of the vertical exhaust pipe of a truck, for example, as an anomalous reading because Nunberg is not concerned with the absolute height of vehicles, but rather with the classification of the vehicle.

German Auslegeschrift 1,218,194 discloses the use of ultrasonic waves transmitted and received by transducers located on the underside of an arched post under which a vehicle passes. This system simply considers the rate at which pulse intervals are received for determining whether a vehicle traveling at a particular speed is following the previous vehicle too closely. No vehicle height data is generated.

U.S. Pat. No. 5,076,384 to Wada et al. discloses an ultrasonic obstacle sensor including an ultrasonic transmitter mounted on a vehicle for transmitting ultrasonic waves toward the road surface, and an ultrasonic receiver for receiving ultrasonic waves reflected from the road surface, whereby the received signal is compared with a reference signal to detect components in the received signal corresponding to obstacles on the road surface. The information collected about the road obstacles is used to control the stiffness of the vehicle suspension.

U.S. Pat. No. 4,015,232 to Sindle discloses an ultrasonic distance detector for vehicles that tells the driver how close portions of the vehicle are to horizontally spaced objects. Sindle describes the mounting of ultrasonic sensing devices around the vehicle, preferably on external vertical surfaces, such as the face of a front bumper for determining how close the vehicle's bumper is to a wall.

U.S. Pat. No. 5,028,920 to Dombrowski discloses a microwave radar device mountable on the rear of a truck that uses the doppler shift principle to detect the presence of a moving target within the transceiver range so that the truck driver is alerted to the presence of objects behind the truck which are moving relative to the truck. Dombrowski discloses a housing which is diagonally sectioned to provide a pivotable top cover. The wave output from the Dombrowski transceiver is transmitted outwardly through a rearwardly protruding channel section on the rear wall of the housing. Dombrowski makes no mention of any movement of the housing when the alerting device is in use, and presumably the microwaves pass through the walls of the housing.

Accordingly, there is a need for a simply, accurate device which can be mounted on the vehicle itself to provide obstacle height information to the driver of the vehicle.

The use of the terms "vehicle" and "truck" is for convenience only, as all types of vehicles and moving objects which move relative to overhead objects, such as recreational vehicles (RVs), airplanes moving into hangars, and ships passing beneath bridges, are intended to be within the scope of the invention.

OBJECTS AND SUMMARY OF THE INVENTION

It is a first object of the invention to provide an anti-collision device which avoids the drawbacks of the prior art systems.

Another object of the invention is to provide an anti-collision device which is carried entirely on a vehicle.

Yet another object of the invention is to provide an anti-collision device which is compact and inexpensive.

Another object of the invention is to provide an anti-collision device which may be mounted on the bumper of a vehicle.

A still further object of the invention is to provide an anti-collision device which is exposed to the elements only during the time period in which the height of an obstacle is being determined.

A further object of the invention is to provide an anti-collision device which is under the control of the operator of a vehicle so that the operator knows with certainty that the device is functioning.

In summary, therefore, the invention is directed to an anti-collision device which is disposed entirely on a vehicle and which provides obstacle height information directly to the vehicle operator.

In one embodiment of the invention the anti-collision device includes means for generating an ultrasonic wave, means for receiving an ultrasonic wave generated by the ultrasonic wave generating means and reflected off an object, means for mounting the ultrasonic wave generating means and the ultrasonic wave receiving means on a portion of a truck, the mounting means being configured for causing the ultrasonic wave generating means to transmit a substantially vertical ultrasonic wave, means operatively connected to the ultrasonic wave generating means and to the ultrasonic wave receiving means for determining a vertical difference between an object and a height of a truck, and means operatively connected to the vertical difference determining means for generating a human-recognizable piece of information corresponding to the vertical difference determined by the vertical difference determining means.

These and other objects and advantages of the invention will be readily apparent in view of the following description and drawings of the above-described invention.

BRIEF DESCRIPTION OF THE DRAWINGS

FIG. 1 is a side elevational view of a first preferred embodiment of the anti-collision device according to the invention, mounted on the bumper of a tractor-trailer combination;

FIG. 2 is a side elevational view of a further preferred embodiment of the invention mounted on the cab of a tractor-trailer combination;

FIG. 3 is an enlarged, sectional view of a portion of FIG. 2, showing the second preferred embodiment of the invention in a non-use position;

FIG. 7 is a schematic, front view of a tractor-trailer combination showing a still further preferred embodiment of the invention.

DETAILED DESCRIPTION OF THE INVENTION

Figure 4:
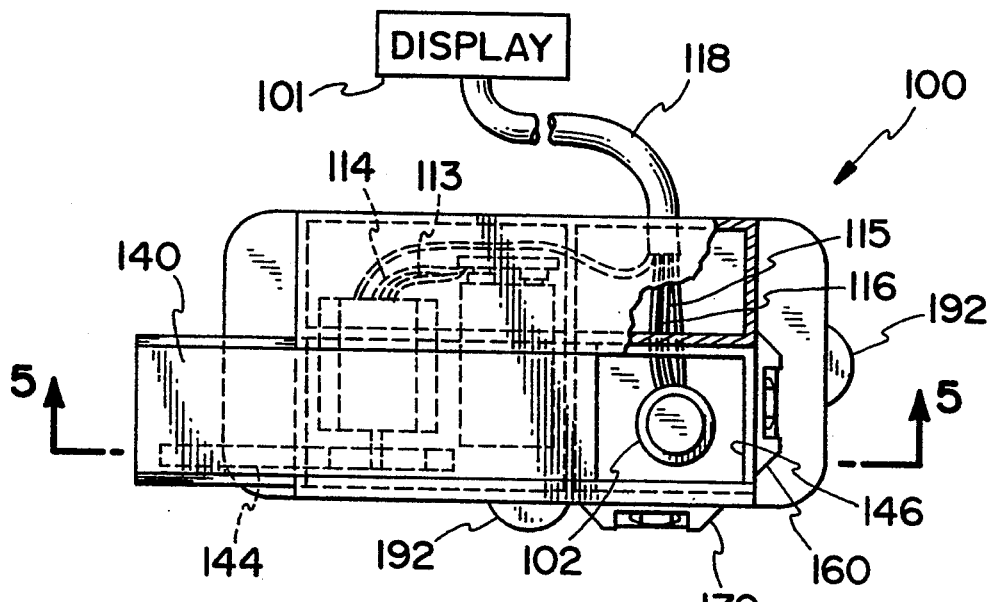
FIG. 4 is a view similar to FIG. 3 showing a plan view of the second preferred embodiment of the invention in an operative position.

FIG. 1 illustrates a typical vehicle 10, such as a tractor-trailer combination, including a tractor or cab 12 connected to a trailer or semitrailer 14. A conventional bumper 16 is mounted on a forward portion of cab 12. A typical bridge B having a lowermost portion L facing a roadway on which vehicle 10 travels, is typical of the objects extending over a roadway along which vehicle 10 travels and under which vehicle 10 must pass without hitting a roof 18, or other uppermost portion of tractor-trailer combination 10, such as a fixed antenna, or a vertically extending exhaust pipe.

A first preferred embodiment of a truck clearance anti-collision device 50 according to the invention is mounted on bumper 16. Anti-collision device 50 includes a conventional ultrasonic wave generating and receiving apparatus that includes an ultrasonic wave transmitter transducer and an ultrasonic wave receiver transducer, such as a SONIN 60 Electronic Tape Measure, produced by Sonin Inc. of Scarsdale, N.Y. A conventional display device 60 having a digital readout is provided on the interior of cab 12 in a location readily visible to the operator of vehicle 10.

A data transmission wire carries height information data from ultrasonic wave device 52 to display device 60. As will be readily understood, a computer device, such as a conventional microprocessor, or chip will process the electronic signals generated by the ultrasonic wave transducer(s). An electrical power transmission wire transmits power from a power supply, such as the conventional vehicle battery. Conventional vehicle batteries are 12 volt DC. A back-up or primary power source can be a standard 9 volt DC battery.

Turning to FIG. 2, a further preferred embodiment of an anti-collision device 100 according to the invention is shown mounted on wall 120. In other words, anti-collision device 100 includes means for mounting device 100 on a portion of a vehicle; e.g., means for mounting device 100 on a roof of a vehicle, and means for mounting device 100 on a hood of a vehicle. Anti-collision device 100 includes a display device 101, preferably mounted inside cab 12.

Figure 5:
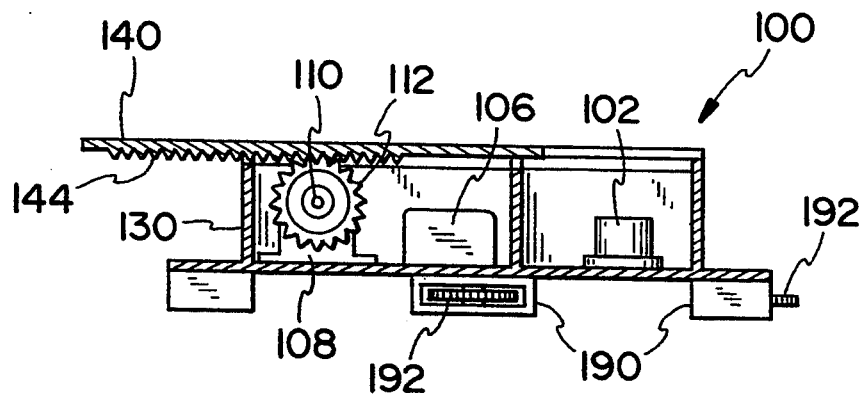
FIG. 5 is a sectional view taken along line 5—5 of FIG. 4.
Figure 6:
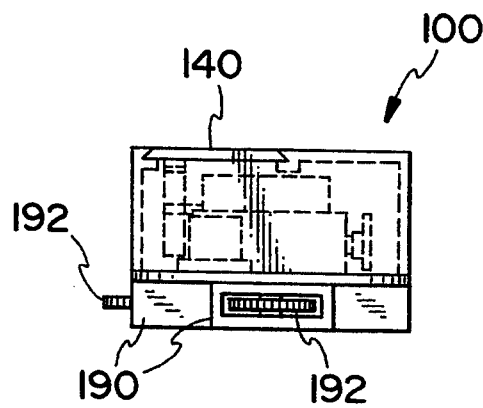
FIG. 6 is an end view of FIG. 4.

FIGS. 3-6 illustrate details of anti-collision device 100. An ultrasonic wave transducer 102 is electrically connected to a battery or power supply 106. A motor 108 having a drive shaft 110 and an attached toothed gear 112. Electrical wires 113, 114 and 115, 116 connect motor 108 and transducer 102 to power supply 106, respectively. A conventional data transmission cable 118 connects ultrasonic wave transducer 102 to a display 101. Display 101, in other words, being part of a means for generating a human-recognizable piece of information, may include a visual display for presenting written material, as well as a means for presenting audio material.

Anti-collision device 100 is mounted on a wall 120 of cab 12. An appropriate opening or openings defined in wall 120 allow the electrical wires 113–116 and data transmission cable 118 to pass into cab 12 or to the vehicle battery, as will be appreciated by a person having ordinary skill in the art.

A weather resistant, waterproof housing 130 encloses all the major components, such as motor 108 and transducer 102. An upper, slidable lid 140 covers transducer 102 and is movable relative to waterproof housing 130. A series of teeth 144 defined on a lower portion of lid 140 mates with toothed gear 112 for relative movement thereto. Housing 130 has an upwardly open opening 146 through which ultrasonic waves U can be transmitted by and received by transducer 102.

To provide additional accuracy, an upper, level-indicating device, such as a conventional bubble-level 160 is disposed on housing 130. A second level 170 is provided on one of the sidewalls of housing 130. Levels 160 and 170 have respective bubbles 182 and 184, captured in a quantity of fluid. A leveling mechanism 190 having an adjustment member 192 is disposed on at least one lower location of housing 130 for varying the distance between housing 130 and vehicle 10 in order to level housing 130 and, hence, transducer 102 relative to vehicle 10 for ensuring accuracy of the transmission and reception of ultrasonic waves U.

In the preferred embodiment of the invention an elongated lid 140 covers transducer 102 when not in use. In this manner, motor 108 is located at a greater distance from transducer 102.

Preferably, two leveling mechanisms 190 are provided at two of the four spaced opposed corners for accuracy.

FIG. 7 schematically shows a front view of a truck cab 12 having a plurality of transducers 202 spaced apart along its bumper 16. This embodiment is particularly suited for determining the height of older, conventional arched bridges in which the height of the lowermost portions of the arched construction varies across the width of the roadway.

OPERATION

In use, the operator will mount ultrasonic wave device 52 on bumper 16 of cab 12 so that ultrasonic waves U will be transmitted and received substantially vertically.

When the driver of vehicle 10 approaches a bridge B which appears to have its lowermost portion L lower than the height of roof 18 of trailer 14, the operator slows down or stops completely at a position in which ultrasonic wave transducer 52 is positioned below bridge B.

The operator then activates anti-collision device 50, and obtains a readout of the distance available between roof 18 and lowermost portion L. In the case of an arched bridge, if the first reading indicates the measured bridge portion is too low, the operator will back up, approach the arched bridge at a higher clearance point to repeat the process and take a reading at a location having an apparently higher lowermost portion L. If none is available, the operator will choose an alternate route.

When using the preferred embodiment of the anti-collision device 100 of FIGS. 3–6, the operator approaches bridge B with cab 12 of vehicle 10 in a similar fashion.

When anti-collision device 100 is in place substantially vertically below bridge B, the operator stops vehicle 10, and turns on anti-collision device 100. Motor 108 is activated for rotating shaft 110, and accordingly gear 112, thereby advancing lid 140 out of its weatherproof position in waterproof housing 130 owing to the engagement of gear 112 with teeth 144 of lid 140. When lid 140 has been advanced interiorally of waterproof housing 130 so that opening 146 is sufficiently large to allow ultrasonic waves U to be transmitted and received, transducer 102 is turned on by appropriate controls conveniently located adjacent the operator on display device 101.

The time required for ultrasonic waves U to be transmitted by transducer 102, reflected off lowermost portion L, and then received by transducer 102 corresponds to the distance from transducer 102 to lowermost portion L. The electrical data corresponding to the elapsed time/height difference is processed by conventional computer/microprocessor/chip means and presented on display device 101, as will readily appreciated by a person having ordinary skill in the art.

In the event that obviously erroneous data is being generated, or when the operator has reason to believe that the accuracy of the sending/receiving of ultrasonic waves U is compromised, as by the unevenness of the road surface or by the curvature of the surface of the overhead object facing the transducer, the operator adjusts the position/levelness of housing 130, and hence transducer 102, by moving adjustment member 192 of one or all of leveling mechanisms 190.

It will be appreciated that the mounted height of ultrasonic transducers above the roadway will be precisely determined and measured, as will be the height of the uppermost portions of the vehicle, so that accurate height difference data will be obtained.

It will understood that the ultrasonic wave transducer can be either a single, conventional wave transducer that functions as both a transmitter transducer and a receiver transducer, or as two separate ultrasonic wave transducers, one of which is an ultrasonic wave transmitter transducer, the other of which is an ultrasonic wave receiver transducer. In other words, along the lines described above, there may be provided a plurality of ultrasound transmitters, and a plurality of ultrasound receivers, the plurality of ultrasound receivers being equal in number to the plurality of ultrasound transmitters, such as would be used in connection with the embodiment of FIG. 7.

It will be further appreciated by a person having ordinary skill in the art that the display device can provide digital data corresponding to the absolute difference between the height of transducer and the lowermost portion of the object to which the height is being measured, a simple go/no go command to the operator, all of the necessary calculations having been made, or some combination of data presented relating to the uppermost portion of a vehicle and the lowermost portion of an overhead object.

It will likewise be understood by those skilled in the art that separate power systems can be provided for the truck and for the anti-collision device.

Furthermore, a backup warning system can be used to indicate to the operator that the anti-collision device is operating improperly.

Still further, it will be appreciated that the anti-collision device according to the invention can be used to detect distance parameters other than height.

A person having ordinary skill in the art will likewise appreciate that alternative waterproof housings and other ways of protecting the transducer when placed on the bumper of the truck cab or on other external surfaces, are within the scope of the invention.

In addition, it is contemplated that dual, elevator-door style lids can be used to cover the transducer when not in use. As to the component, such as the motor and 9 volt back-up battery, the respective locations relative to the transducer may be switched, or otherwise varied, as will be appreciated by a person having ordinary skill in the art.

While this invention has been described as having a preferred design, it is understood that it is capable of further modifications, uses and/or adaptations of the invention following in general the principle of the invention and including such departures from the present disclosure as come within the known or customary practice in the art to which to invention pertains and as may be applied to the central features hereinbefore set forth, and fall within the scope of the invention and of the limits of the appended claims.

What is claimed is:

1. A vehicle clearance anti-collision device, comprising:
   a) means provided for generating an ultrasonic wave;
   b) means provided for receiving the ultrasonic wave generated by said ultrasonic wave generating means and reflected off an object;
   c) means provided for mounting said ultrasonic wave generating means and said ultrasonic wave receiving means on a portion of a vehicle;
   d) said mounting means being configured for causing said ultrasonic wave generating means to transmit a vertical ultrasonic wave;
   e) means operatively connected to said ultrasonic wave generating means and to said ultrasonic wave receiving means for determining a vertical difference between the object and the height of the vehicle; and
   f) means operatively connected to said vertical difference determining means for generating a human-recognizable piece of information corresponding to the vertical difference determined by said vertical difference determining means.

2. The vehicle clearance anti-collision device as defined in claim 1, wherein:
   a) said mounting means includes means for attaching said ultrasonic wave generating means on the bumper of the vehicle.

3. The vehicle clearance anti-collision device as defined in claim 1, wherein:
   a) said mounting means includes means for attaching said ultrasonic wave receiving means on the bumper of the vehicle.

4. The vehicle clearance anti-collision device as defined in claim 1, wherein:
   a) said human-recognizable piece of information generating means includes a visual display for presenting written material.

5. The vehicle clearance anti-collision devices as defined in claim 1, wherein:
   a) said human-recognizable piece of information generating means includes means for presenting audio material.

6. The vehicle clearance anti-collision device as defined in claim 1, wherein:
   a) said mounting means includes means for attaching said ultrasonic wave generating means on the roof of the vehicle.

7. The vehicle clearance anti-collision device as defined in claim 1, wherein:
   a) said mounting means includes means for attaching said ultrasonic wave generating means on the hood of the vehicle.

8. The vehicle clearance anti-collision device as defined in claim 1, wherein:
   a) said mounting means includes means for attaching said ultrasonic wave generating means to the exterior wall of the vehicle.

9. The vehicle clearance anti-collision device as defined in claim 1, wherein:
   a) a waterproof housing is disposed adjacent to and configured to surround said ultrasonic wave generating means and said ultrasonic wave receiving means.

10. The vehicle clearance anti-collision device as defined in claim 9, wherein:
    a) a movable lid portion is disposed on said waterproof housing; and
    b) means is provided on said waterproof housing for moving said movable lid portion when said ultrasonic wave generating means and said ultrasonic wave receiving means are in use.

11. The vehicle clearance anti-collision device as defined in claim 10, wherein:
    a) said lid portion extends along the length of said waterproof housing.

12. The vehicle clearance anti-collision device as defined in claim 1, wherein:
    a) said ultrasonic wave generating means includes a plurality of ultrasound transmitters.

13. The vehicle clearance anti-collision device as defined in claim 12, wherein:
    a) said ultrasonic wave receiving means includes a plurality of ultrasound receivers, said plurality of ultrasound receivers being equal in number to said plurality of ultrasound transmitters.

14. The vehicle clearance anti-collision device as defined in claim 1, wherein:
    a) a single ultrasonic wave transducer comprises said ultrasonic wave generating means and said ultrasonic wave receiving means;
    b) means is operatively associated with said single ultrasonic wave transducer for causing said single ultrasonic wave transducer to alternately function as a transmitter transducer and a receiver transducer.

* * * * *